United States Patent [19]

Quatrini et al.

[11] 4,185,078

[45] * Jan. 22, 1980

[54] EXTRACTION PROCESS FOR RECOVERY OF RHENIUM

[75] Inventors: L. Rita Quatrini, Athens; Martin B. MacInnis, Towanda, both of Pa.

[73] Assignee: GTE Sylvania Incorporated, Stamford, Conn.

[*] Notice: The portion of the term of this patent subsequent to Sep. 20, 1994, has been disclaimed.

[21] Appl. No.: 926,167

[22] Filed: Jul. 19, 1978

Related U.S. Application Data

[63] Continuation-in-part of Ser. No. 818,938, Jul. 25, 1977, abandoned, which is a continuation of Ser. No. 712,817, Aug. 9, 1976, Pat. No. 4,049,771, which is a continuation of Ser. No. 510,067, Sep. 12, 1974, abandoned.

[51] Int. Cl.$^2$ ............................................ C01G 47/00
[52] U.S. Cl. ........................................ 423/49; 423/54; 75/101 BE
[58] Field of Search ....................... 423/49, 54, 658.5; 75/101 BE

[56] References Cited

U.S. PATENT DOCUMENTS

| | | | |
|---|---|---|---|
| 3,244,475 | 4/1966 | Churchward | 423/54 |
| 3,495,934 | 2/1970 | Ziegenbaly et al. | 75/101 BE |
| 3,558,268 | 1/1971 | Prates et al. | 423/49 |
| 3,739,057 | 6/1973 | Daugherty et al. | 423/49 |
| 3,798,305 | 3/1974 | Pagnozzi et al. | 75/101 BE |
| 3,855,385 | 12/1974 | Dorosset et al. | 423/54 |
| 3,856,915 | 12/1974 | Pagnozzi et al. | 423/49 |

*Primary Examiner*—Herbert T. Carter
*Attorney, Agent, or Firm*—Donald R. Castle

[57] ABSTRACT

A process is disclosed wherein essentially all of the rhenium can be removed from an aqueous solution of molybdenum without the extraction of molybdenum using a particular solvent extraction solution. The extraction solution consists essentially of quaternary ammonium compound and at least about 50 percent by volume of a highly aromatic solvent which dissolves a quaternary ammonium-rhenium complex to the extent of at least 0.1 percent by volume selected from the group consisting of benzene and an aromatic solvent containing primarily lower alkyl benzenes having molecular weights of either 106, 120, 134 or 148 with minor amounts of relatively long chain aliphatic hydrocarbons containing greater than 8 carbon atoms and minor amounts of napthalene.

2 Claims, 2 Drawing Figures

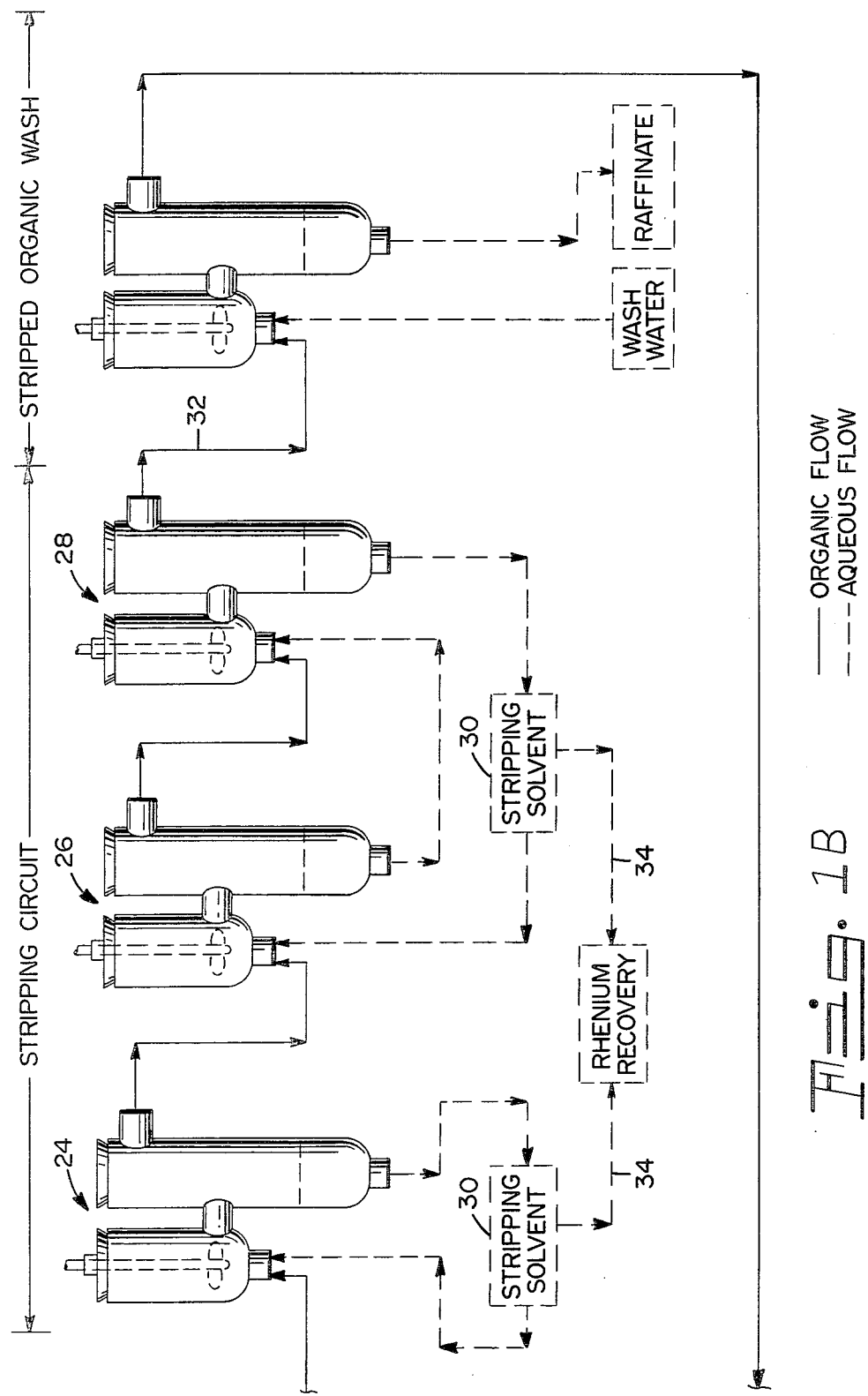

EXTRACTION PROCESS FOR RECOVERY OF RHENIUM

CROSS REFERENCE TO RELATED APPLICATION

This application is a continuation-in-part of Ser. No. 818,938 filed July 25, 1977, abandoned which was a continuation of Ser. No. 712,817, filed Aug. 9, 1976 now U.S. Pat. No. 4,049,771; a continuation of Ser. No. 510,067, Sept. 12, 1974, abandoned, and assigned to the assignees of the present invention.

BACKGROUND OF THE INVENTION

1. Field of the Invention

This invention relates to an improved process for the recovery of rhenium values from aqueous molybdenum solutions containing rhenium. In particular, it relates to a process for the recovery of rhenium from sodium molybdate solutions prepared from molybdenite concentrates.

2. Prior Art

Rhenium is often present in small amounts in molybdenite concentrates. For example, molybdenite concentrates formed as a by-product from the recovery of other metals from ores such as copper contain small amounts of rhenium, generally in order of from 0.4 to 4 pounds per ton of concentrate. Recovery of even these rhenium values can aid appreciably in lower overall manufacturing costs because of the high cost of rhenium. Usually these concentrates are roasted to recover the molybdenum as molybdenum oxide and the rhenium values are volatilized. The rhenium values are then recovered from the flue dusts and gases by contacting them with water or some other solvent, such as an acidic or basic medium. The rhenium values are then extracted from such rhenium bearing solutions by ion-exchange. According to U.S. Pat. No. 2,876,065, the impure clarified rhenium solution is passed through ion-exchange equipment in intimate contact with a strongly basic alkylamine-type synthetic resin. Examples of commercially available resins are Amberlite IRA-400 and Dowex 1×8. After elution to remove molybdenum and other impurities, the rhenium is eluted with a strong mineral acid such as perchloric acid. Rhenium sulfide ($Re_2S_7$) is precipitated from the rhenium-bearing acid solution by $H_2S$ gas. The rhenium sulfide is then oxidized and converted to $NH_4ReO_4$ by the addition of $NH_4OH$. The $NH_4ReO_4$ is crystallized by evaporation.

A similar process is disclosed in U.S. Pat. No. 3,244,475 except that a liquid ion-exchange material is used instead of an ion exchange resin to recover the rhenium. The rhenium values are recovered from the aqueous solution by means of a quaternary ammonium compound carried in kerosene with primary decyl alcohol as the solubilizer. The foregoing process is also described in the Bureau of Mines Report of Investigation #6246 entitled "Sources and Recovery Methods for Rhenium" by the inventors of the foregoing patent. The amine is stripped with dilute perchloric acid and $NH_4ReO_4$ is recovered in much the same manner as is disclosed in U.S. Pat. No. 2,876,065. In the foregoing report #6246, it is disclosed that various acids and salt solutions were tried and only perchloric acid and perchlorate salt solutions were effective in removing rhenium from the organic. Under the conditions disclosed in the patent, the extraction efficiency was lowered upon recycle of the extraction system. For example, as shown in Example 1 in the original pass 142 mg. of rhenium was extracted out of 152 mg., or 94.5 percent of the rhenium, and upon recycle, the recycle extracted only 85 percent of the rhenium. The foregoing Bureau of Mines Report also states that reuse of the organic results in lower extraction efficiencies particularly when perchloric acid was used as the stripping agent.

More recently, however, the U.S. Pat. No. 3,558,268 discloses a process similar to the above processes in which ammonium thiocyanate ($NH_4SCN$) is used as the stripping agent and crystallization of $NH_4ReO_4$ directly from the $NH_4SCN$ solution is claimed, thereby eliminating the sulfide precipitation and oxidation steps.

There are several disadvantages with the foregoing processes which result in recovery appreciably less than all of the rhenium initially present in the solutions. For example, the molybdenum must be separated from the rhenium by roasting prior to the recovery of rhenium and that technique generally results in losses of up to about 50 percent of the rhenium present due to volatilization. Additionally, after the recovery of rhenium by the extraction processes mentioned, the raffinate discarded contains 0.01 grams Re/liter. This concentration is often higher than that found in some concentrates. Also, reuse of the organic solution as the salt from perchlorate, thiocyanate, etc. which result after stripping with the agents previously disclosed, sharply lowers the extraction coefficients. The decrease in the extraction capacity with use is believed to be associated with the insolubility of the loaded amine in the decylalcoholamine-kerosene system.

It is believed, therefore, that a process that enables recovery of essentially all of the rhenium and an organic extraction solution that can be regenerated without an appreciable loss in extractive capacity is an advancement in the art.

OBJECTS AND SUMMARY OF THE INVENTION

It is an object of this invention to provide an improved process for the extraction and recovery of rhenium from molybdenum solution containing relatively low concentrations of rhenium.

It is a further object of this invention to provide an improved organic selective extraction solution which can be regenerated and recycled.

It is still a further object of this invention to provide a process capable or recovering essentially all of the rhenium from molybdate solutions.

It is an additional object of this invention to provide a process capable of recovering rhenium from solutions having a low concentration of rhenium.

These and other objects are achieved in one embodiment of the invention wherein a process extracting rhenium from an aqueous molybdate solution is achieved by extracting with an organic extractant consisting essentially of at least about 0.05 percent by volume of a quaternary ammonium compound, water-insoluble hydrocarbon solvent having predominantly high aromatic content which dissolves a quaternary ammonium-rhenium complex to the extent of at least about 0.1 percent volume. The quaternary ammonium compounds which are particularly useful are those with the general formula $[R_3(CH_3)N]^+A^-$, in which R is an alkyl group of from about 8 to about 10 carbon atoms and A is an anion, derived from mineral acids. Particularly useful extractants are tricaprylyl monomethyl ammonium chloride and tricaprylyl monomethyl ammonium nitrate. Useful solvents are benzene and SC-28 which is primarily a mixture of alkyl benzenes having molecular weights of either 106, 120, 134 or 148, a minor amount of relatively long chain aliphatic hydrocarbons and a minor amount of naphthalene.

BRIEF DESCRIPTION OF THE DRAWING

The drawing is a flow sheet of one embodiment of the invention.

DETAILED DESCRIPTION OF THE PREFERRED EMBODIMENTS

Figure 1A:
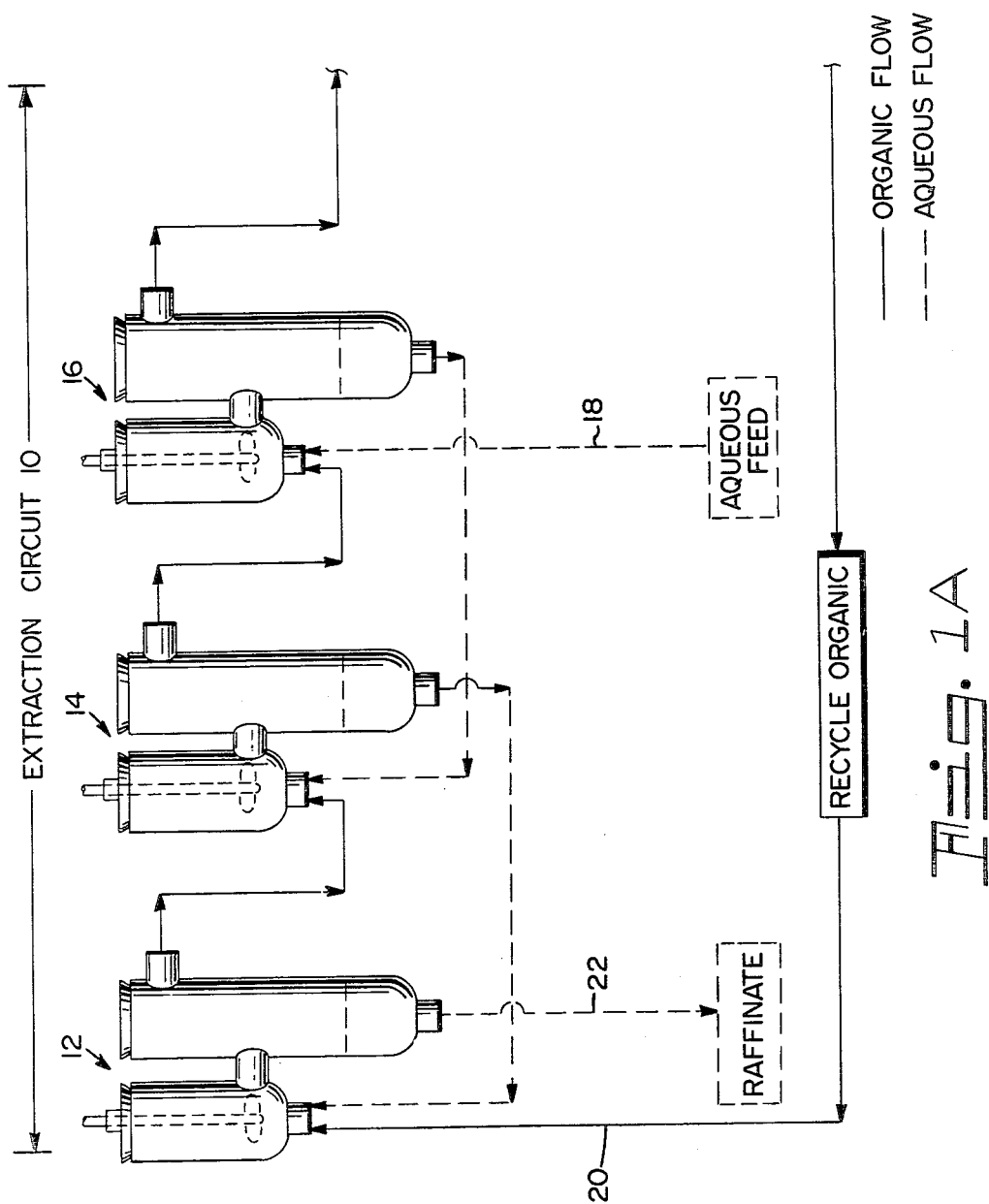

For a better understanding of the present invention, together with other and further objects, advantages and capabilities thereof, reference is made to the following specification and appended claims in connection with the aforedescribed drawing.

As previously mentioned, the active extractant is a quaternary ammonium compound represented by the formula:

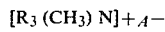

$$[R_3(CH_3)N]^+ A^-$$

wherein R is an alkyl group having an average of from about 8 to about 10 carbon atoms and A is an anion derived from a mineral acid. Although R is shown as having a definite chain length, it is to be understood that the extractant can be a mixture of hydrocarbons having an average carbon chain length of from 8 to 10. It is preferred that R have an average chain length of about 8, thus tricaprylyl monomethyl ammonium compounds are preferred. A in the foregoing formula can be any anion derived from a mineral acid and will be dependent in a continuous system upon the stripping agent used. For example, if perchlorate is desired for A, then perchloric acid can be used as the stripping agent. If nitrate is desired for A, then nitric acid is the stripping agent. Nitric acid is the preferred stripping agent and will convert the commercially available tricaprylyl monomethyl ammonium chloride to the nitrate. Tricaprylyl monomethyl ammonium chloride is sold by General Mills Corporation under the trade name Aliquat 336.

The solvents used are high aromatic content solvents and seem to overcome the difficulties associated with the aliphatic hydrocarbon solvent used in the prior art. The prior art solvent systems lost extraction efficiency and new extractant had to be added because rhenium extraction efficiencies would drop appreciably. Suitable solvents include benzene and a particularly preferred solvent which has desired characteristics from a handling standpoint is a high aromatic content solvent sold by Buffalo Solvents and Chemical Corporation under the trade name S.C.28. S.C.28 is an aromatic petroleum solvent of petroleum origin, having as its main constituents a mixture of alkyl benzenes having molecular weights of either 106, 120, 134 or 148 with minor amounts of aliphatic hydrocarbons containing greater than 8 carbon atoms and naphthalene. The boiling point, flash point and specific gravity can vary slightly. For example, the boiling point range can be from about 155° C. to about 205° C., the flash point can vary from about 40° C. to about 50° C. and the specific gravity can vary from about 0.85 to about 0.86. A major criteria for the solvent is that it will dissolve at least 0.1 percent by volume of the quaternary ammonium-rhenium complex.

The concentration of quaternary amine in the organic extraction solution will be dependent upon the concentration of rhenium in the feed and the ratio of rhenium to molybdenum in the feed. The concentration of the amine active extractant is low, that is, in the range of from about 0.05 percent to about 1 percent by volume when the concentration of rhenium to molybdenum is from 1:2000 to 1:3000. Higher concentrations above about 1 percent tend to extract some of the molybdenum values in the foregoing illustration. Concentrations lower than about 0.05 percent by volume requires excessively large volumes of extractant solutions to be utilized. If the rhenium concentration is significantly above 50 mg/liter or significantly less molybdenum is present in relation to rhenium, higher concentration of active extractant can be used. If there is not a significant amount of molybdenum present, then only the limitation imposed upon the maximum concentration of the amine results from the viscosity of the solution.

The organic to aqueous volumetric ratios can be varied within the practical limits of from about 1:10 to about 10:1. The number of extraction stages used will be primarily dependent upon the ratio of organic to aqueous and the concentration of rhenium in the aqueous phase.

To more fully illustrate the invention, the following non-limiting examples are given. All parts, proportions and percentages are by volume unless otherwise indicated.

EXAMPLE 1

To aid in the description particular reference is made to the drawing in which the extraction circuit 10, consists of three units 12, 14, and 16 connected in series. The aqueous feed stream 18 (containing about 30 mg/liter of rhenium and about 66 grams/liter of molybdenum) enters unit 16 at the rate of about 41 ml/minute while the organic phase 20 enters unit 12 providing counter current flow at the rate of about 12.5 ml/minute. The extractant solutions consists essentially of 0.1 percent by volume tricaprylyl monomethyl amine and 99.9 percent by volume of S.C.28. The raffinate 22 containing the molybdenum values exists from unit 12. The organic phase exists from unit 16 and enters the stripping circuit comprised of generally at least three units illustrated in the drawing as units 24, 26, and 28 at unit 24. The stripping solution 30 enters units 24 and 26 and the stripped organic 32 exits from 28 and is recycled. Although a 4 N nitric acid stripping solution at the rate of about 8 ml/minute is suitable, other stripping agents can be used, such as perchloric acid, perchlorate salt solutions, ammonium triocyanate and the like. The rhenium values 34 exit from units 24 and 28. Although in the drawing there is illustrated only three extraction units in the stripping circuits, more or less in either circuit can be employed. Additionally, the organic can be washed with water to remove water soluble impurities if desired. The product stream 34 is sent to a recovery system to recover the rhenium values such as by conversion of the perrhenic acid contained in stream 34 to ammonium perrhenate or other known recovery techniques.

EXAMPLE 2

An organic extraction solution is prepared containing varying amounts of amine and decyl alcohol as a solubilizer and kerosene as a solvent. An aqueous solution containing sodium molybdate and rhenium at concentrations of 100 g. to 120 g. MoO₃/liter and 40 to 90 mg Re/liter brought into contact with the organic solutions. The following table gives the results of the experiment.

| % Aliquat 336 % Decyl Alcohol | | Volume Ratio - O:A | | | | | | |
|---|---|---|---|---|---|---|---|---|
| | | 1:1 | 1:2 | 1:3 | 1:4 | 1:5 | 1:10 | 1:50 |
| *10.00 | % Re Ext. | 100*** | | | | | | |
| 0.00 | % Mo Ext. | 10 | | | | | | |
| *10.00 | % Re Ext. | 100 | | | | | | |
| 5.00 | % Mo Ext. | 10 | | | | | | |
| *5.00 | % Re Ext. | 100 | | | | | | |
| 3.00 | % Mo Ext. | 10 | | | | | | |
| **1.00 | % Re Ext. | 100 | 100 | 100 | 100 | 100 | | |
| 1.00 | % Mo Ext. | — | — | — | — | — | | |
| **0.50 | % Re Ext. | 100 | 100 | 100 | 100 | 100 | 100 | 100 |
| 0.50 | % Mo Ext. | — | — | — | — | — | 10 | 20 |
| **0.10 | % Re Ext. | 75.12 | 70 | 70 | 70 | 65 | | |
| 0.10 | % Mo Ext. | — | — | — | — | — | | |
| **0.01 | % Re Ext. | 13 | — | — | — | — | | |
| 0.01 | % Mo Ext. | 10 | — | — | — | — | | |

*Aqueous 40-50 mg Re/l
**~ 90 mg Re/l
***Organic separated into 2 phases after extraction.

As is clearly shown, unless the Aliquat 336 decyl alcohol are both at the 0.5 percent to 1 percent level and the Re concentration is higher than 90 mg. Re/liter, then either the recovery of Re is lower or else some molybdenum is extracted.

EXAMPLE 3

An aqueous solution containing about 40 mg/liter of rhenium is contacted with five of the organic extraction solutions. In each instance 0.1 percent Aliquat 336 is the extractant. The organic solutions are stripped to remove the rhenium, then are recycled for a number of times. The five organics used are:

1. 0.1 percent Aliquat 336 in benzene.
2. 0.1 percent Aliquat 336, 0.2 percent decyl alcohol, balance kerosene.
3. 0.1 percent Aliquat 336, 0.1 decyl alcohol, 10 percent benzene, balance kerosene.
4. 0.1 percent Aliquat 336, 0.1 percent decyl alcohol, 10 percent benzene, balance kerosene.
5. 0.1 percent Aliquat 336, 0.1 percent decyl alcohol, 25 percent benzene, balance kerosene.

The amount of rhenium extracted on the first pass is essentially the same for organics 1 through 5. After being recycled only Organic #1 remains at its original level. Organic #2 after about 17 recycles has about 60 percent of its original extraction capacity. After 24 recycles Organic #1 still remains essentially at the original level.

EXAMPLE 4

Essentially the same procedure as in Example 3 is used. The following organics are prepared:

Organic
1. 0.1 percent Aliquat 336, balance benzene.
2. 0.1 percent Aliquat 336, 0.2 percent decyl alcohol, balance kerosene.
3. 0.1 percent Aliquat 336, balance HAN*.
4. 0.1 percent Aliquat 336, 25 percent benzene, balance HAN*.
5. 0.1 percent Aliquat 336, 50 percent benzene, balance HAN*.
6. 0.1 percent Aliquat 336 in S.C. #28.

*HAN is Heavy Aromatic Naphtha supplied by the Solvents and Chemical Group of Chicago, Ill.

Organics 1, 5, and 6 remain at the same efficiency after numerous recycles while Organics 2, 3, and 4 all decrease upon recycling.

The foregoing examples are believed to conclusively illustrate the advantage of a highly aromatic solvent system over the parafinic kerosene system.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein an aqueous solution containing a relatively high concentration of molybdenum and a relatively low concentration of rhenium is contacted by selective organic extractant solution to preferentially extract the rhenium therefrom without an appreciable extraction of molybdenum into the organic solution and thereafter the organic and aqueous soltuions are separated and the rhenium values are separated from the organic phase, the improvement comprising:

(a) providing an organic extractant solution consisting essentially of from at least 0.05 percent to about 0.1 percent by volume of a quaternary ammonium compound of the formula $[R_3(CH_3)N]^+A^-$, wherein R is an alkyl group having from about 8 to 10 carbon atoms and A is an anion derived from a mineral acid as the active extracting agent and at least 50 percent by volume of an aromatic solvent having as its major constituents, a mixture of alkyl benzenes having molecular weights of either 106, 120, 134 or 148, minor constituents of aliphatic hydrocarbons containing more than 8 carbon atoms and naphthalene, and contacting said organic extractant with an aqueous solution containing molybdenum and rhenium values, wherein the ratio of concentration of rhenium to the concentration of molybdenum is from about 1:2000 to about 1:3000 and the concentration of rhenium is below about 50 mg/liter, (b) stripping essentially all of the rhenium value from said extractant after the aqueous solution has been contacted by said extractant and the organic and aqueous have been separated, and (c) continuously recycling said extractant solution to extract further rhenium values without a substantial loss in extraction capacity.

2. The process of claim 1 where the ratio of organic extractant to aqueous solution is between about 1:10 to about 10:1.

* * * * *